P. W. Vail.
Pouncing Hats.
No 69277  Patented Sep. 24, 1867.
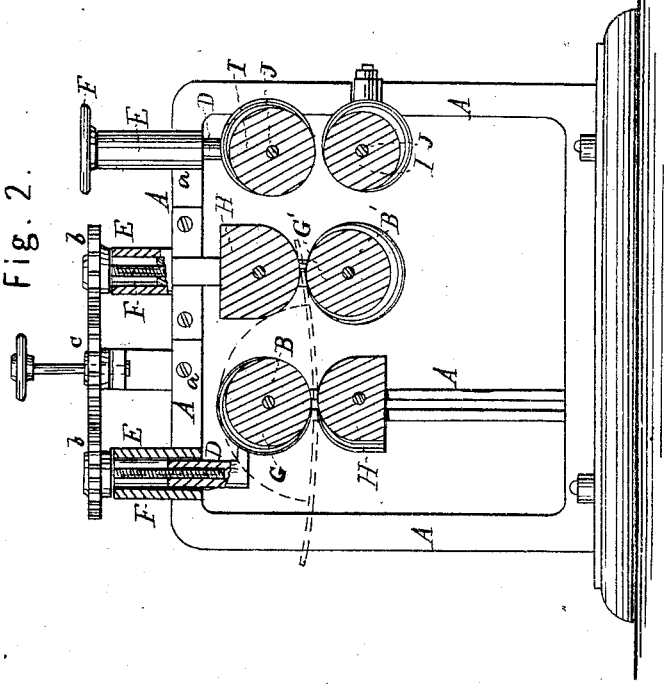
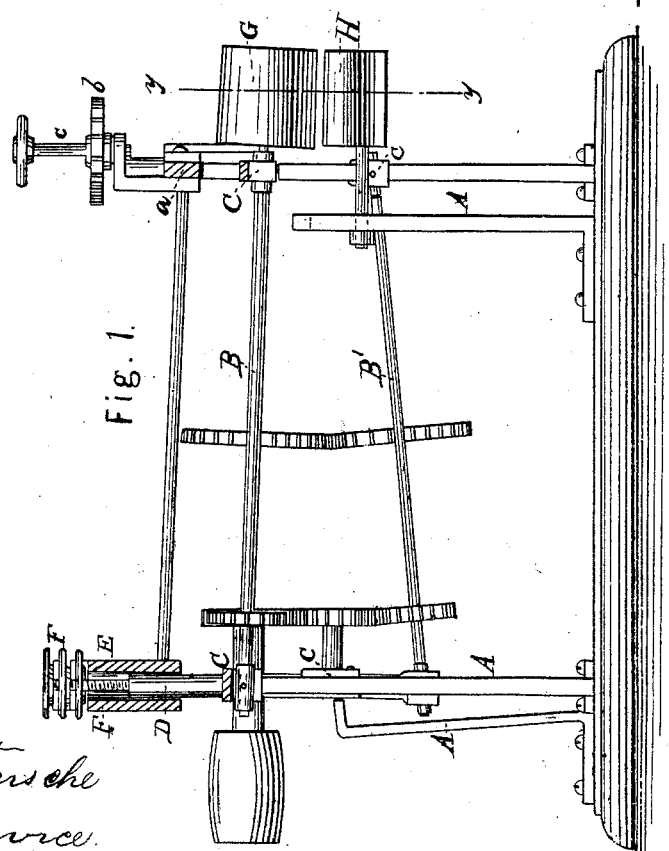
Witnesses.
Theo Tusche
J. A. Service
Inventor.
P. W. Vail
Per
Munn & Co.

United States Patent Office.

P. W. VAIL, OF NEWARK, NEW JERSEY.

Letters Patent No. 69,277, dated September 24, 1867.

---

IMPROVED MACHINE FOR POUNCING HATS.

---

*The Schedule referred to in these Letters Patent and making part of the same.*

---

TO ALL WHOM IT MAY CONCERN:

Be it known that I, P. W. VAIL, of Newark, Essex county, New Jersey, have invented a new and improved Machine for Pouncing the Brims of Hats; and I do hereby declare that the following is a full, clear, and exact description thereof, which will enable others skilled in the art to make and use the same, reference being had to the accompanying drawings, forming part of this specification, in which—

Figure 1 represents a side elevation, partly in section, of my improved brim-pouncing machine.

Figure 2 is a vertical cross-section of the same, taken on the line $x\ x$, fig. 1.

Similar letters of reference indicate corresponding parts.

This invention relates to certain improvements on the hat-pouncing machine, for which Letters Patent were granted to Emile Nargaret on the eighteenth day of September, 1866.

The invention consists in so arranging the brackets and pouncing-rollers, between which the brim of the hat body is fed, that both sides of the same may be pounced at once, while on the aforesaid machine of Nargaret only one side of the brim could be pounced at a time. The feed-rollers, as well as the pouncing-rollers, are adjustable up and down, so as to expose the brim to more or less pressure, as may be desired.

A represents a frame made of wood or other suitable material, composed of uprights, which are connected at their top and bottom ends. B B' are two shafts, which have their bearings in boxes C. The latter are pivoted to the respective bifurcated lower ends of the vertical tubular hangers D D, which are arranged in the frame A, so as to be adjustable up and down. To the upper cross-bars $a\ a$ of the frame are secured vertical tubes E, into which the upper ends of the tubes D fit, and they are then secured to screws F F, as shown in fig. 1, so that by turning these screws the tubes D, and with them the shafts D, or any end of the latter, can be raised or lowered at will. To the front end of each shaft B B' is mounted a conical pouncing-roller, G and G'; below the former and above the latter is arranged and firmly secured to the frame A a bracket, H H', as is clearly shown in fig. 1. By operating the screws F above the front ends of the shafts B B', the rollers G G' can be brought closer to or further from their respective brackets. Each of these screws is provided with a pinion, $b$, on top, into the teeth of which a gear-wheel, $c$, meshes, which is arranged on the frame $a$, as is clearly shown in fig. 2, so that by turning the wheel $c$ both rollers G and G' are operated simultaneously, and are thus set at equal distances from their respective brackets. I I are the feed-rollers, which are mounted on the ends of the shafts J J, the lower one being hung in bearings, which are firmly secured to the frame A, while the upper shaft is made up, and down, adjustable in a manner similar to that described for adjusting the shafts B and B'. The brim of the hat or hat body is placed between the rollers I I, and is by them fed between the roller G' and bracket H', whereby its under side is pounced, and is then fed between the roller G and bracket H, where its upper side is pounced, as is clearly shown in fig. 2.

Having thus described my invention, what I claim as new, and desire to secure by Letters Patent, is—

The arrangement of the pouncing-rollers G and G', supporting-beds H and H', and feed-rollers I I', all being made adjustable substantially as and for the purpose specified.

P. W. VAIL.

Witnesses:
 WM. F. McNAMARA.
 ALEX. F. ROBERTS.